United States Patent [19]

Bolen

[11] 4,174,049

[45] Nov. 13, 1979

[54] DEVICE FOR PURGING PITOT AND STATIC LINE TUBES

[75] Inventor: Ralph A. Bolen, London, Ohio

[73] Assignee: John Sawyer, Cincinnati, Ohio

[21] Appl. No.: 851,167

[22] Filed: Nov. 14, 1977

[51] Int. Cl.$^2$ .............................................. B67B 7/24
[52] U.S. Cl. ........................................ 222/5; 73/182; 73/212; 222/148
[58] Field of Search ...................... 222/5, 81, 83, 83.5, 222/88, 148, 504; 137/318; 73/182, 212; 239/272

[56] References Cited

U.S. PATENT DOCUMENTS

| | | | |
|---|---|---|---|
| 3,059,814 | 10/1962 | Poncel et al. | 222/5 |
| 3,326,231 | 6/1967 | Hogg | 137/318 |
| 3,327,530 | 6/1967 | Lepird | 73/182 |
| 3,380,298 | 4/1968 | Hanson | 73/182 |
| 3,879,771 | 4/1975 | Nakane | 222/5 X |
| 4,083,187 | 4/1978 | Nagashima | 222/5 X |

Primary Examiner—Robert J. Spar
Assistant Examiner—Fred A. Silverberg
Attorney, Agent, or Firm—Kinney and Schenk

[57] ABSTRACT

A spool valve includes a disposable, replaceable cylinder containing gaseous media under pressure which is selectively introduced into the pitot and static lines of an aircraft for purging same incident to the endwise movement of a normally retracted plunger which comprises the valving member of the valve. The plunger, when in an inoperative position, maintains certain instruments in open communication with the pitot tube and outside static lines of an aircraft. When the plunger is advanced to an operative position, the aforesaid connections between the instruments, pitot tube, and outside static lines are closed, whereupon the gaseous media under pressure is introduced into the lines leading to the pitot tube and outside static air line for thereby purging said lines, and simultaneously therewith the instruments are automatically connected to an auxiliary pitot tube and auxiliary outside static lines. If the gas thus introduced under pressure fails to completely purge the lines, the plunger is adapted to be maintained in its fully advanced position by a continuously energized solenoid for enabling the pilot of the aircraft to utilize the auxiliary equipment.

15 Claims, 7 Drawing Figures

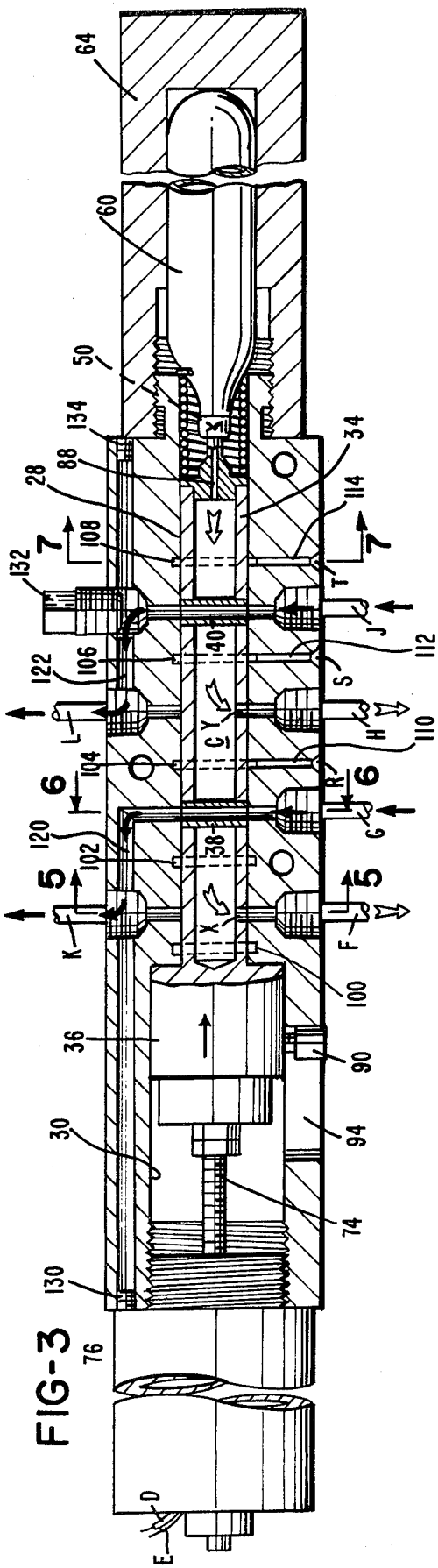

DEVICE FOR PURGING PITOT AND STATIC LINE TUBES

BACKGROUND OF THE INVENTION

1. Field of the Invention

The field of the invention is directed to devices for purging the pitot tube and outside static lines of an aircraft by the introduction of a gaseous media under pressure.

2. Description of Prior Art

Applicant is aware of the following patents which, in his opinion, are most relevant to the subject invention.

U.S. Pat. No. 3,380,298 to V. W. Hanson discloses a device for purging the pitot tubes of aircraft which utilizes three individually operable solenoid valves 10, 12, and 14 which are controlled by means of a toggle switch 22 which is manually operable between "purge", "vent", and "read" positions as the switch lever is shifted to one or the other of positions "A", "B", or "C". The three solenoid valves, switches, and accessory components are housed within a metal box 25 which is provided with a thermostatic electric heater to maintain a selected temperature and prevent freezing.

A pilot is able to "read" on a manometer 29 the pressure of pitot tube 27; or by moving the toggle of a toggle switch 22 to position B, to "vent" said system; or by moving said toggle to position A, to purge the pitot tube by introducing filtered compressed air from a tank 24 to the pitot tube while closing air intake 31 by means of solenoid valve 10-16. During those periods of time when the pitot tube is being "vented", intake 31 is open to the atmosphere and solenoid valves 10-16, 12-18, and 14-20 are closed for preventing the introduction of compressed air into the system and for effecting a circulation of air from the atmosphere to the pitot tube.

When it is desired to "read" the pressure, solenoid valve 10-16 remains closed to prevent the introduction of compressed air into the system; however, solenoid valves 12-18 and 14-20 are open to apply the "velocity pressure" and static pressure from the pitot tube to manometer 29.

After the manometer has been "read" the toggle switch is returned to position A to resume purging.

U.S. Pat. No. 2,016,926 to J. Josepowitz discloses Apparatus for Emptying and Cleaning Beer and Other Pipes by means of compressed air from tank 12 which is introduced into the pipes to be cleaned when one or more air-control valves are manually opened.

U.S. Pat. No. 3,327,530 to F. P. Lepird discloses a Marine Speedometer which includes a pitot tube (strut) 12 having an opening 20 therein which is connected to an indicator 16 by means of conduits 26 and 28 which are disposed on opposite sides of a manually operable valve 30 which includes a line in which a plunger 58 is reciprocably mounted. A spring 62 normally urges the plunger to the left for locating a passageway 66 in open communication with conduits 26 and 28. The plunger is shifted to the right against the counterforce of spring 62 by air pressure introduced against the left end of the plunger via a source 38 of pressurized fluid, to wit a pump the piston of which is manually reciprocated by means of a stem 98 which terminates in a handle 122. Movement of plunger 58 to the right moves passageway 66 out of relationship with conduits 26 and 28 for placing conduit 26 in open communication with pump 38 whereby air is forced through opening 20 of the pitot tube 12 to purge same. The plunger 58 will automatically shift to the left for restoring communication between conduits 26 and 28 via passageway 66 of the plunger when the pumping action is discontinued.

Applicant is unaware of any prior art more relevant to the subject invention than the disclosures of the references discussed, supra, none of which disclose, suggest, or relate to a spool valve having associated therewith a self-contained source of gaseous media under pressure.

SUMMARY OF THE INVENTION

It is not uncommon for the pitot tube and/or the pitot-static tube of aircraft, particularly privately owned, that is the non-commercial aircraft, to accumulate foreign substances such as, by way of example, dirt, insects, insect eggs, ice, and the like, the presence of which substances impairs or destroys the effectiveness of the pitot tube and/or the pitot-static tubes of aircraft as a source of air pressure to indicators which are observed by the pilot of the aircraft.

When the efficiency of the pitot tubes is impaired or destroyed the accuracy of the information as displayed on the instruments connected thereto is rendered unreliable, if not completely nullified, with the result that the pilot is deprived of accurate, reliable knowledge concerning such important factors as the air speed, rate of climb or descent, and height of the aircraft.

In those instances in which the lines between the pitot tubes and the instruments are "broken", that is, uncoupled, in order to enable the pitot tube to be purged by the introduction of compressed air into the uncoupled lines, the aircraft cannot be flown again until after the reconnected lines have been inspected and approved or certified by government-authorized personnel who are qualified to make such inspections. The time required and the expense involved in having the reconnected lines approved or certified is considerable.

The valve of the present invention provides simple, yet highly effective, means in the form of a spool valve which has a disposable, easily replaceable source of gaseous media under pressure operatively associated therewith, whereby said valve, where interposed in the lines connecting the pitot tube, and/or pitot-static tube, to indicating instruments, permits the pitot tubes to be quickly and effectively purged via the pressurized gaseous media without necessitating that the line be "broken" or disconnected.

The valve is so constructed and arranged as to automatically connect the indicating instruments in operative relationship with auxiliary pitot and/or pitot-static tubes during those periods of time when the valve is in "purging" relationship with the standard or normal pitot and/or pitot-static tubes.

The subject valve also includes means for maintaining the spool thereof in "purging" relationship for indefinite periods of time, as determined by the pilot, in the event that the purging operation should, for some freak reason, be unsuccessful, thereby permitting the pilot to operate on the auxiliary pitot tubes.

The compact size of the device is evident from the fact that uniformly satisfactory results have been obtained from a valve whose overall dimensions, including the source of pressure media and the solenoid operating means, is less than 10 inches long by less than two inches in diameter.

BRIEF DESCRIPTION OF THE DRAWINGS

FIG. 3 is a view similar to FIG. 2 illustrating the relationship of the parts when the plunger or valving member has been shifted to a fully advanced position.

FIG. 4 is a view taken on line 4—4 of FIG. 2.

FIG. 5 is a view taken on line 5—5 of FIG. 3.

FIG. 6 is a view taken on line 6—6 of FIG. 3.

FIG. 7 is a view taken on line 7—7 of FIG. 3.

DESCRIPTION OF THE PREFERRED EMBODIMENT

Figures 1, 2:
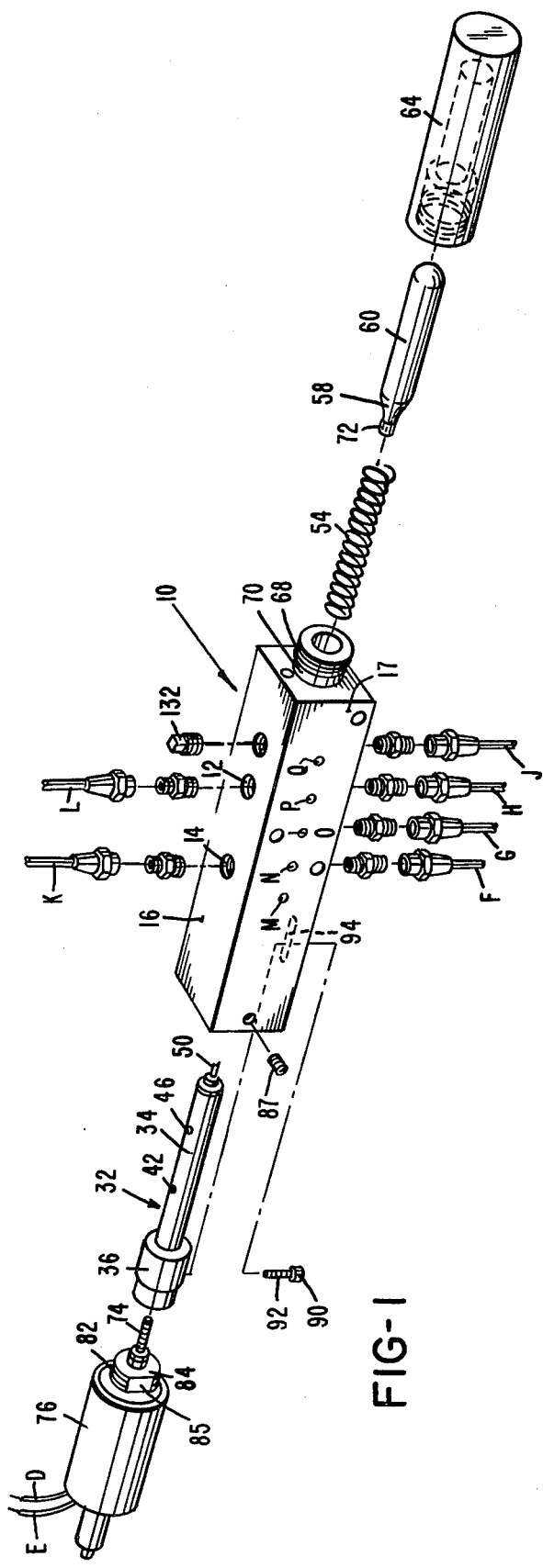
FIG. 1 is an exploded, perspective view of the component parts which, when assembled collectively, comprise the valve of the subject invention.
FIG. 2 is a side view partly in section illustrating the elements of the valve of FIG. 1 in a fully assembled position with the plunger or valving member thereof in a fully retracted position.

With reference to the drawings the numeral 10 denotes the body of the device, which for ease of understanding will hereinafter be referred to as a valve. Said valve is fabricated from any suitable material such as metal or plastic whereby to have ports 12 and 14 in valve body surface 16 and having ports 18, 20, 22, and 24 in body surface 26 which, in the embodiment shown, is disposed in spaced parallelism with surface 16.

The interior of the body is provided with a forward axial bore 28 of a lesser diameter than a rearward axial bore 30.

An elongate piston or valving member denoted generally by the numeral 32, includes a forward elongate portion 34 and a rearward elongate portion 36, wherein the forward portion 34 is dimensioned for snug slideable relation within forward axial bore 28 and wherein the rear portion 36 is dimensioned for endwise movement within rearward axial bore 30.

The forward portion 34 comprises, as best illustrated in FIGS. 2-7, a hollow, elongate, tubular portion C having a pair of hollow tubular members 38 and 40 extending diametrically therethrough in laterally spaced relationship, wherein the opposite ends of said tubular members 38 and 40 define port openings 42, 44, 46, and 48 respectively of through passageways A and B of the forward elongate portion 34 of the piston or valving member 32.

The forward end of the forward portion 34 is in open communication with a hollow, piercing-needle 50 of an end plug 52 which is fixedly secured, such as by means of brazing and the like, to the outer end of 34.

A spring 54 is interposed between the outer forward surface 56 of end plug 52 and the forward inwardly tapered portion 48 of a gas cylinder 60 which is housed within axial bore 62 of an end cap 64, the rear end of which is internally threaded as at 66 for threaded engagement with the external threads 68 of the forwardly projecting nose portion 70 of body 10, whereby the forward tip 72 of gas cylinder 60 is disposed in spaced, endwise, axial relationship with the hollow piercing needle 50.

The rear end of the rear portion 36 of the valving member is securely though releaseably anchored to the forward end 74 of the armature of a solenoid 76 by interengagement between the external threads of 74 with the internal threads of the axial bore 78 of portion 36. The body of the armature is securely though releaseably fastened to the internally threaded portion 80 of rear piston 36 by means of external threads 82 of the forward projection 84 of the solenoid body.

The forward projection 84 of the solenoid housing is provided with a flat surface 85 which is adapted to be aligned with and engaged by a set screw 87 (FIG. 1) for preventing the accidental or unintentional loosening or removal of the solenoid from the valve body.

The letters D and E indicate conductors through which electrical current is applied via a suitable manually operated switch (not illustrated) to the solenoid coil for energizing same to instantly advance the armature and the valving member to which it is connected from the fully retracted position of FIG. 2, to the fully advanced position of FIG. 3 for driving the hollow piercing needle 50 into the forward tip 72 of the gas cylinder 60, whereby the pressurized gaseous media within the cylinder will be released through conduit 88 into the interior C of the forward portion 34 of the valving member.

Rotation or turning of the valving member 32 within the valve body 10 is prevented by means of the interaction between a pin or the head 90 of a bolt 92 the shank of which is securely though releaseably anchored to rear portion 36 of the valving member and an elongate slot 94 in the valve body.

Ports 18 and 20 are connected to a conventional pitot tube and pitot-static tube (not illustrated), respectively by means of conduits F and G, wherein the pitot tube associated with conduit F is the main pitot tube as normally supplied as a conventional item of an aircraft. A so-called alternate, or stand-by, pitot tube is associated with conduit G and said tube is, in many instances, an accessory item which is added to the plane.

Ports 22 and 24 are connected to duplicate pitot-static tubes of static systems externally of the plane by means of conduits H and J, wherein the static system connected to conduit H is supplied as standard equipment, whereas the static system connected to conduit J is an optional accessory.

Ports 12 and 14 are connected via conduits L and K to conventional indicating instruments in the cockpit of a plane for indicating air speed, rate of climb, and the altitude of the plane. The present invention is neither concerned with nor directed to the structural details of the instruments, pitot tubes or static systems since they are conventional and well known in the art.

The present invention is directed to a valving mechanism which can be operated to simultaneously purge conduits F and H and the pitot tube and static systems to which they are connected wherein the alternate pitot tube and alternate static systems are instantly and automatically connected to the plane's instruments via conduits L and K.

If at the end of the purge cycle, when the valving member is released from its forwardly advanced position, incident to deenergization of the solenoid, and returned to the fully retracted position of FIG. 2, it should turn out that the first pitot tube or the pitot-static tube were not completely purged, in which event they would not provide an accurate reading on the instruments to which they are connected, the pilot will again, but this time continuously, energize the solenoid for maintaining the valving member in the fully advanced position of FIG. 3 for connecting and maintaining the alternate pitot tube and alternate static system in operative relationship with the instruments. During this later condition, the purging effect of the gaseous media within cylinder 60 will have been dissipated, and conduits F and G are out of communication with the instrument conduits K and L.

After the pressurized gaseous media of a cylinder 60 has been dissipated it is but a simple matter to unthread the end cap 64 for providing access to the spent cylinder which is discarded and replaced with a fresh cylinder, after which end cap 64 is again secured to the valve body, thereby placing the subject valve in operative condition for a subsequent purging operation.

From the foregoing it will be noted that the purging operation of the pitot tube, static system, and conduits F and H is accomplished without requiring that any of the said four items be disassembled or disconnected, unless, and only in the event that, the purging operation should fail to actually purge, that is, open the said four items to the free flow of air therethrough.

The regulations of the Civil Aeronautics Authority prescribe that once the conduits to any of the instruments from the pitot tube or static system are disconnected or disassembled for any reason whatsoever, such as, by way of example, disconnecting a conduit such as F or H so that they can be "blown out" by compressed air for purging said conduits and the pitot tube or static system to which they are attached, the plane cannot be thereafter flown until the hookup is certified by an authorized inspector, a time-consuming and very expensive procedure.

With further reference now to the drawings, it will be noted that bore 28 of the valve body is provided with a plurality of laterally spaced, annular ports 100, 102, 104, 106, and 108, wherein each of said annular ports are exhausted to the atmosphere via passageways such as 101 and 109, which terminate in ports M, N, O, P, and Q in surface 17 of the valve body, and wherein ports 104, 106, and 108 are exhausted to the atmosphere via passageways 110, 112, and 114 which terminate in ports R, S, and T in surface 26 of the valve body.

The purpose of ports 100, 102, 104, 106, and 108 is to eliminate the need for "0" rings and to insure the absence of exhaust or back pressure within the interior of the valve body.

It will be noted that when the valving member has been shifted to its fully advanced position (FIG. 3), ports 12 and 14 and their respective conduits K and L are disposed in open communication with passageways A and B via conduits 120 and 122 respectively.

The numerals 130, 132, and 134 denote generally externally threaded plugs which are screwed into the internally threaded ends of various conduits in the valve body for closing same. If desired, plug 132 may be replaced by a pressure gauge.

The letters X and Y designate a pair of laterally spaced port openings through the forwardly extending hollow portions C of the valving member, said ports being disposed on opposite sides of passageway 38 which extends diametrically through said hollow portion of the valving member. Port opening Y is disposed in open communication with the second port 20 of the four ports in surface 26 of the body during those periods of time when the valving member is in its fully retracted position, whereas port opening X is in communication with area Z which surrounds the rear end of the forward portion of the valving member when fully retracted, as in FIG. 2.

When the valving member has been thrust forwardly to its fully advanced position, port opening X is disposed in open communication with port 18, the first of the four ports in surface 26, and whereas port opening Y is disposed in open relationship with port 22, the third of the four ports in surface 26 as clearly illustrated in FIG. 3.

From the foregoing it will be noted that when the valving member is in a fully advanced position the gaseous media from cylinder 60 is discharged via passageway 88 into the elongate opening C of the hollow portion of the valving member whereby the gaseous media under pressure will be discharged through port openings X and Y into ports 18 and 22 viz, the first and third ports of surface 26 thence through conductor F and H for not only purging lines F and H, but also purging the pitot tube or pitot-static tubes to which conductors F and H are connected.

When the valving member is in the fully retracted position passageways 38 and 40 establish communication between ports 18 and 22 of surface 26, that is the first and third of said ports, with ports 14 and 12 respectively of the two ports in surface 16 whereby the pitot and pitot-static tubes are disposed in open communication with the indicating instruments which are responsive to the pressure conditions in conductors F and H. However, when the valve is advanced as in FIG. 3, the instruments which are connected to conductors K and L are disconnected from conductors F and H and said instruments are instantaneously and automatically connected to an auxiliary pitot tube and pitot-static tubes which are in open communication with conductors G and J.

The subject valve is adapted to be mounted outside the cabin of a plane, such as, by way of example, on the left wing, in the wheel-well or nose, at a location adjacent the pitot tube and static system.

From the foregoing it will be noted that I have provided a compact, fool-proof valve assembly which includes as a part thereof, a self-contained source of pressurized gaseous media, such as nitrogen, carbon dioxide, or the like, and wherein the valve includes means for directing the gaseous media incident to closing communication between the instruments and the pitot tube and static system to the said pitot tube and static system while simultaneously connecting the said instruments in open, operative communication with an auxiliary or stand-by pitot tube and static system, whereby the first mentioned pitot tube and static system and the conduits thereto may be purged without disconnecting any of the conduits.

What is claimed is:

1. A spool valve having associated therewith a self-contained source of gaseous media under pressure which comprises:
   a. an elongate body portion having an axial bore therethrough, said body having a forward and a rear end;
   b. an elongate valving member mounted in the axial bore of the body portion for movement between fully advanced and retracted positions, said valving having a rear end and a hollow forward end, a pair of laterally spaced tubular passageways which extend diametrically through the hollow portion of the valving member, said passageways having the interiors thereof closed to the hollow portion of the valving member;
   c. a sealed cylinder containing a gaseous media under pressure;
   d. means mounting said cylinder relative to the forward end of the body portion and in axial alignment with the axial bore thereof;

e. cylinder-piercing means on the forward end of the valving member;

f. means normally maintaining said valving member in a fully retracted position with the cylinder-piercing means in spaced relationship with respect to the cylinder;

g. and means operable to advance the valving member from a fully retracted to a fully advanced position for driving the cylinder-piercing means into said cylinder for releasing the gaseous contents thereof interiorly of the hollow forward end of the valving member.

2. A valve as called for in claim 1, wherein the ends of said passageways terminate in port-openings in the outer surface of the valving member.

3. A valve as called for in claim 2, wherein the valve body includes four laterally spaced ports in a first surface thereof along that portion of the body in which the hollow portion of the valving member is located, and two laterally spaced ports in a second surface of said valve body; the port openings of one of said diametrically disposed passageways being disposed in open communication with the first of the four ports in said first surface and with the first of the two ports in the said second surface and with the port openings of the other of said diametric passageways disposed in open communication with the third of the four ports in the said first surface and with the second of the two ports in said second surface when the valving member is in a retracted position; the port openings of said first mentioned diametric passageway being disposed in open communication with the second of the four ports in the said first surface and with the first of the two ports in the said second surface with the port openings of the other diametric passageway in open communication with the fourth of said ports in the said first surface and with the second of said two ports in the second surface during those periods of time when the valving member is in a fully advanced position.

4. A valve as called for in claim 3, wherein a pair of laterally spaced ports are provided through the wall of the hollow portion of the valving member, said ports being located on opposite sides of that diametric passageway through the hollow portion of the valving member which is furthest removed from the forward end of the valving member; said laterally spaced ports being disposed, respectively, in open communication with the first and third of the four ports in said body member during those periods of time when the valving member has been shifted to a fully advanced position thereby placing the interior of the hollow portion of the valving member in open communication with the first and third ports.

5. A valve as called for in claim 4, wherein a plurality of laterally spaced annular ports are disposed inwardly of and along the axial bore of the body portion, and means venting each of said annular ports to the atmosphere.

6. A valve as called for in claim 5, wherein each of the said annular ports inwardly of and along the axial bore of the body portion are disposed in open, circumscribing relationship with portions of the outer surface of the hollow forward end of the valving member.

7. A valve as called for in claim 3, wherein the elongate valving member includes a hollow forward portion the diameter of which is substantially less than the diameter of its rearward portion and wherein the axial bore of the elongate body portion includes a forward portion dimensioned to slideably receive that portion of the valving member which is of a reduced diameter and which includes a rear portion dimensioned to slideably receive the larger diameter rearward portion of the valving member, and wherein the ports in the first and second surfaces of the valve body are located in that portion of the valve body in which the axial bore of reduced diameter is located.

8. A valve as called for in claim 4, wherein the gaseous media within the chamber is released into the interior of the hollow portion of the valving member and thence through the ports through the wall of said hollow portion into the first and third ports of the valve body, upon movement of the valving member to a fully advanced position.

9. A valve as called for in claim 1, wherein the means for advancing the valving member from a retracted to a fully advanced position comprises a solenoid the body of which is secured to and carried by the rear end of the valve body.

10. A valve as called for in claim 1, wherein the means normally retaining said valving member in a fully retracted position with the cylinder-piercing means in spaced relationship to the cylinder comprising a spring interposed between adjacent surfaces of the valving member and cylinder.

11. A valve as called for in claim 1, wherein the means mounting said cylinder relative to the forward end of the body portion and in axial alignment of the axial bore thereof comprises an elongate end-cap having a closed-ended axial bore therein for the reception of a cylinder, and means for securely, though releaseably, attaching said cap to the forward end of the valve body.

12. A device for purging the pitot and/or pitot-static tubes of an aircraft with pressurized gaseous media which comprises:

a spool valve which includes an elongate valve body having an axial bore therethrough and having a forward and a rear end;

a valving spool reciprocably mounted within the axial bore of the valve body for movement between fully retracted and advanced positions, the forward end of said spool terminating in a hollow piercing-tip, said spool having an elongate hollow tubular forward portion and a cylindrical rearward portion;

a housing for the reception of a disposable gas cylinder removably secured to the forward end of the valve body and in open communication with the forward end of the axial bore thereof;

means secured to and carried by the rear end of the valve body for selectively advancing the valving spool from a fully retracted to a fully advanced position within the axial bore of said valve body;

said valving spool including at least one through-passageway for placing a pitot tube in open communication with a recording instrument when said valve spool is in a fully retracted position and for terminating the open communication between said pitot tube and recording instrument when the spool valve is in a fully advanced position;

and means in said valve spool establishing communication between the interior of the hollow tubular portion of the valving spool and the pitot tube only when the valving spool has been moved to its fully advanced position.

13. A device as called for in claim 12, wherein a disposable gas cylinder containing a gaseous media under pressure is disposed within the cylinder-receptive housing with the rear end of the cylinder in spaced relationship with the forward end of the valving spool when said spool is in a fully retracted position, whereby penetration of said cylinder by the piercing-tip of the valving spool incident to movement of the spool to a fully advanced position releases the gaseous media from the cylinder into the hollow portion of the valving spool and thence to the pitot tube.

14. A device as called for in claim 13, wherein the relationship of the through-passageway of the valving spool to the axial bore of the valve body is such as to prevent passage of gaseous media from the hollow portion of the spool to a recording instrument.

15. A device as called for in claim 12, wherein the relationship of the through-passageway of the valving spool to the axial bore of the valve body is such that when the valving spool is in a fully advanced position a second auxiliary pitot tube is placed in open communication with the same recording instrument with which the first mentioned pitot tube was connected to when the valving spool was in its fully retracted position.

* * * * *